(No Model.)

J. J. SKINNER.
JAW TRAP.

No. 351,809. Patented Nov. 2, 1886.

Witnesses,
J. J. Maloney
A. J. Locke

Inventor,
Joseph J. Skinner,
by Jos. P. Livermore
Att'y.

UNITED STATES PATENT OFFICE.

JOSEPH J. SKINNER, OF BOSTON, MASSACHUSETTS.

JAW-TRAP.

SPECIFICATION forming part of Letters Patent No. 351,809, dated November 2, 1886.

Application filed March 17, 1886. Serial No. 195,536. (No model.)

*To all whom it may concern:*

Be it known that I, JOSEPH J. SKINNER, of Boston, county of Suffolk, State of Massachusetts, have invented an Improvement in Animal-Traps, of which the following description, in connection with the accompanying drawings, is a specification, like letters on the drawings representing like parts.

My invention relates to an animal-trap of that class in which a pair of jaws are acted upon by a spring, which is strained when the jaws are open, and is set by opening the jaws and engaging one of them by a dog, which is itself held by a trigger connected with a bait-pan. In traps of this kind as commonly made the dog lies over the inner face of the jaw, and, when the trap is sprung is thrown outward from between the jaws, so that it sometimes operates to throw the animal's leg from between the jaws, thus permitting the animal to escape.

The object of the present invention is to remove this objection; and the invention consists, mainly, in the novel construction of the dog, the main portion of which lies beneath the jaw, and is engaged by the trigger or detent in the usual manner. The dog is provided with a finger, which projects over and engages the jaw from the outside thereof, and when the trap is sprung the jaw is released without throwing any part of the dog out from between the jaws.

Figure 1:
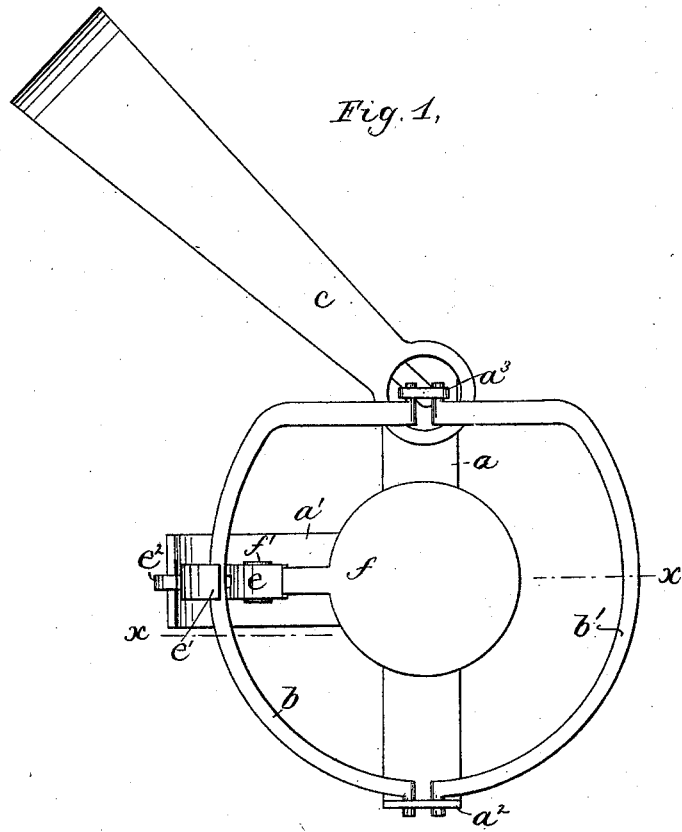
Figure 2:
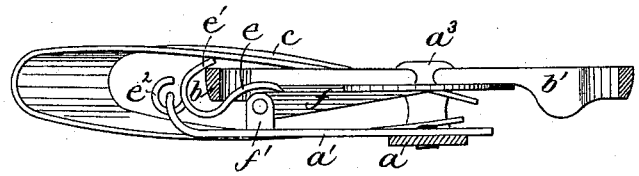

Figure 1 is a plan view of a trap embodying this invention, and Fig. 2 a vertical section thereof on line $x\ x$, showing the dog and bait-pan in elevation.

The main portion of the trap, consisting of a base plate or frame, $a\ a'$, jaws $b\ b'$, pivoted in an upturned portion, $a^2$, of the base-plate $a$, and a jaw-post, $a^3$, attached to the said base-plate $a$, and the spring $c$, acting on said jaws, are all of usual construction. The trap is set by bending down the portion of the spring $c$ that acts on the jaws, and separating or opening the jaws, one of which is then engaged by the dog $e$, which is itself engaged by the notch in the trigger or bait-pan $f$ in the usual manner. The dog $e$ is pivoted at $e^2$ to the cross-piece $a'$ of the frame, and instead of passing over the jaw $b$, as is usual in traps of this kind, it passes beneath the said jaw, and is provided with a finger, $e'$, that projects over the jaw from the outside thereof, and receives the upward pressure of the jaw, by which the point of the dog $e$ is retained in engagement with the trigger. By this construction, when the trap is sprung by moving the bait-pan downward in the usual manner, the dog $e$ is not thrown outward from a point within the jaws to the outside thereof, as is usual, and there is consequently no possibility of the dog throwing the leg of the animal which may be between the jaws to the outside thereof, as sometimes happens in traps of usual construction, in which the dog extends over instead of under the jaw.

The dog $e$ may be of cast or sheet metal, and when of the latter the ear by which it is pivoted to the cross-piece $a'$ may be cut out from the main portion of the dog and bent through the eye or opening made in the end of the cross-piece $a'$, as shown in the drawings, a part of the opening left in the dog by the ear $e^2$ appearing in Fig. 1 at the inside of the jaw.

The portion of the finger $e'$ that bears on the jaw is preferably inclined with relation to the face of the jaw, as shown, so that the latter has a wedging action on the dog as well as the direct pressure derived from the force of the spring acting on the jaw. The space between the finger or overhanging portion $e'$ and the main portion of the dog below the jaw forms a recess, which receives the jaw when the trap is set and permits the jaw to escape when the trap is sprung or the dog released.

The trigger $f$ is shown as pivoted on the usual pan-post, $f'$, that is fixed on the cross-piece $a'$; but the invention is not limited to this method of pivoting the trigger, as it may have its fulcrum directly on the cross-piece $a'$, as shown in another application, Serial No. 195,534, filed herewith March 17, 1886, and I do not in the present application claim such construction of the trigger, the present application being limited to the construction of the dog herein shown and described, in combination with the jaw and a suitable trigger to control the said dog.

I claim—

1. In a trap, the combination of the frame, pivoted jaws, and jaw-actuating spring, with a trigger and a dog pivoted upon the frame-work at a point more remote from the middle of the trap than the adjacent part of the open jaw, and provided with a finger engaging the jaw at the outer side thereof, the main portion of the dog extending from its pivot to the trigger beneath the jaw, which latter overlies the dog at a point between its pivot and trigger, whereby the dog engages the trigger with an upward pressure thereon, substantially as described.

2. The combination of the base-plate, including a cross-piece provided with an eye or opening, with the jaws and their actuating-spring, the trigger, and a dog composed of a piece of sheet metal having a strip or tongue cut from the body thereof and bent through the eye in the cross-piece, the said dog extending from the eye of the cross-piece to the trigger below the open jaw, and having an overhanging portion which engages the jaw, substantially as described.

In testimony whereof I have signed my name to this specification in the presence of two subscribing witnesses.

JOSEPH J. SKINNER.

Witnesses:
  JOS. P. LIVERMORE,
  H. P. BATES.